UNITED STATES PATENT OFFICE.

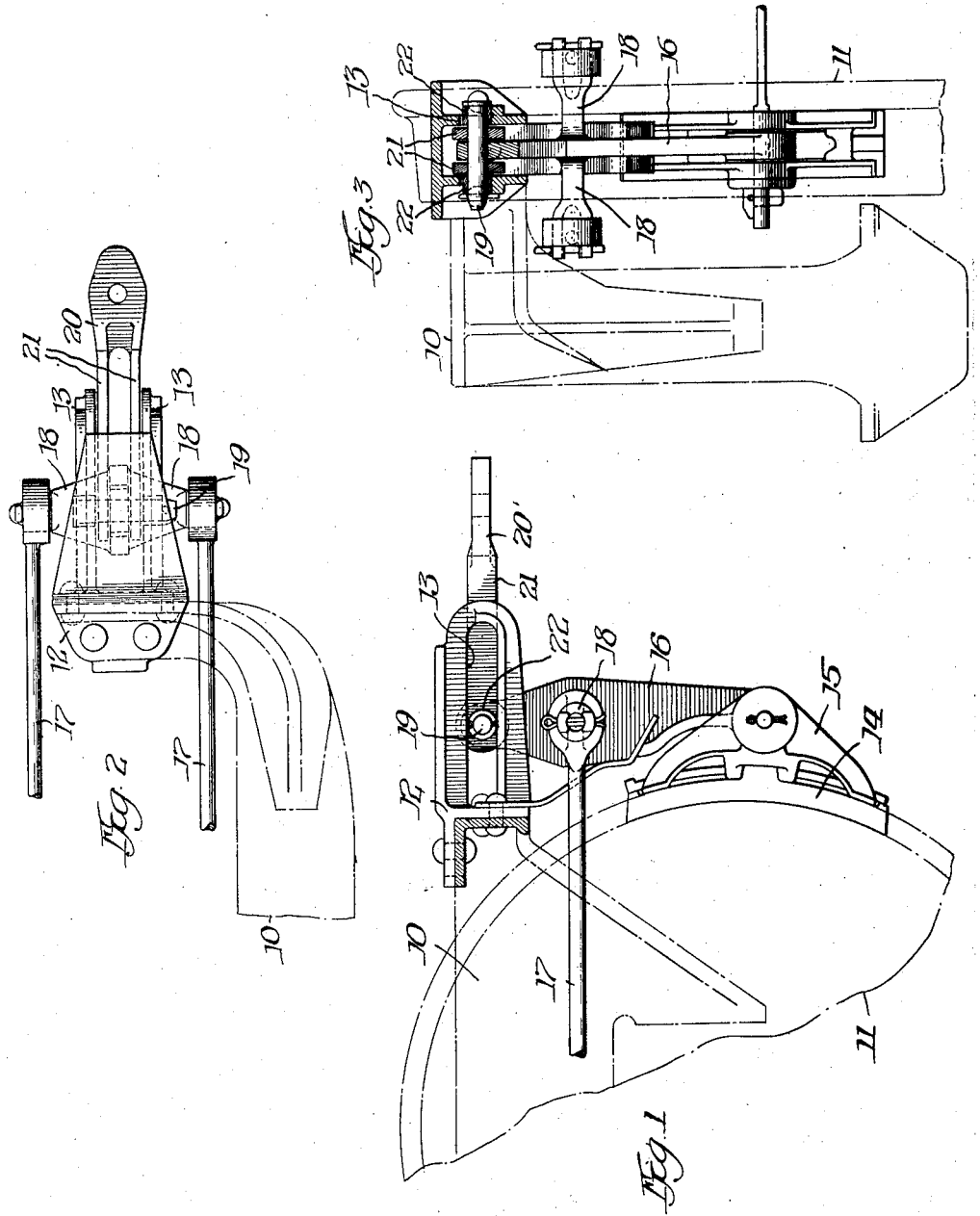

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

1,339,414.      Specification of Letters Patent.      Patented May 11, 1920.

Application filed April 22, 1918. Serial No. 229,929.

*To all whom it may concern:*

Be it known that I, ARMAND H. PEYCKE, a citizen of the United States, and resident of Chicago, in the county of Cook and State of Illinois, have invented certain new and useful Improvements in Brake Mechanism, of which the following is a specification.

This invention relates to brake mechanism.

One of the objects of the invention is to movably support brake mechanism in an efficient manner.

Another object is to provide brake supporting mechanism whereby elements of the brake rigging are free to move in accordance with operating conditions.

Generally speaking these and other objects are accomplished by providing in brake mechanism, the combination of a brake lever, and anti-friction means for movably supporting the same.

The invention is illustrated on the accompanying sheet of drawings, in which—

Figure 1 is a fragmentary side elevation of brake mechanism, embodying my invention.

Fig. 2 is a fragmentary plan view of the same, and

Fig. 3 is a fragmentary end view of the same, parts being in section.

Referring to the figures of the drawings, it will be noted that I have shown a railway car truck frame 10, supported by wheels 11, only one of which is shown. Secured to the truck frame 10 is a bracket 12, having an elongated slotted guideway 13, extending longitudinally of the truck. Coöperating with the wheel 11 is a brake shoe 14 which is mounted in a brake head 15, to which is pivotally connected the lower end of a brake lever 16, said brake lever being operatively connected with an associated brake lever, not shown, by pull rods 17, arranged on opposite sides of a single wheel and being pivotally connected to oppositely extending arms 18 formed on the levers 16. This brake lever 16 in effect, is of a cross shape.

The upper end of the lever 16 is apertured and provided with a pin 19 to which is pivotally connected the bifurcated end of a pull rod 20. The jaws 21 of this pull rod 20 straddle the upper end of the lever 16. Mounted on the outer ends of the pin 19 are two rollers 22, which are adapted to roll in the bracket guideway 13, whereby the lever 16 is free to move longitudinally of the car, as a result of operating conditions.

By means of supporting the brake lever in this manner, a simple arrangement is provided whereby the brake lever may move readily and at the same time support the rigging at a given distance from the tracks.

There may be various modifications of my invention, and it is my intention to cover all such modifications, which do not depart from the spirit and scope of the following claims.

I claim:

1. In brake mechanism, the combination of a truck side frame having a laterally extending portion lying in the vertical plane of the associated truck wheel, a bracket secured thereto, and a brake lever carrying a pin at its upper end slidably supported by said bracket.

2. In brake mechanism, the combination of a truck side frame having a laterally extending portion lying in the vertical plane of the associated truck wheel, a bracket secured thereto having a guide slot, and a brake lever mounted in said guide slot and having its pin slidably engaging the bracket for supporting said lever.

Signed at Chicago, Illinois, this 11th day of April, 1918.

ARMAND H. PEYCKE.

Witnesses:
 CHAS. L. BYRON,
 C. M. OBERBECK.